United States Patent
Nakamura (10) Patent No.: US 8,241,582 B2
(45) Date of Patent: Aug. 14, 2012

(54) REACTOR WITH ELECTRICAL INSULATING FILM, FUEL CELL APPARATUS, ELECTRONIC DEVICE AND METHOD OF PRODUCING ELECTRICAL INSULATING FILM

(75) Inventor: Osamu Nakamura, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 1220 days.

(21) Appl. No.: 12/011,742

(22) Filed: Jan. 29, 2008

(65) Prior Publication Data

US 2008/0182146 A1 Jul. 31, 2008

(30) Foreign Application Priority Data

Jan. 31, 2007 (JP) ................................ 2007-020816

(51) Int. Cl.
*B01J 19/00* (2006.01)
*H01M 8/06* (2006.01)
*H05B 3/10* (2006.01)
*H05B 3/18* (2006.01)

(52) U.S. Cl. ........ 422/199; 422/240; 429/416; 219/542; 219/544; 219/546; 219/548; 219/553

(58) Field of Classification Search .......... 219/544–546, 219/553, 542, 548; 422/199, 240; 429/416
See application file for complete search history.

(56) References Cited

U.S. PATENT DOCUMENTS

| 3,610,888 A * | 10/1971 | Button ........................ 219/543 |
| 6,818,338 B2 | 11/2004 | Kubota et al. |
| 6,991,868 B2 | 1/2006 | Lee et al. |

FOREIGN PATENT DOCUMENTS

| EP | 527349 A1 * | 2/1993 |
| JP | 8-166269 A | 6/1996 |
| JP | 9-035531 A | 2/1997 |
| JP | 2003-306351 A | 10/2003 |
| JP | 2004-063131 A | 2/2004 |
| JP | 2004-256837 A | 9/2004 |
| WO | WO 01/86744 A1 | 11/2001 |

OTHER PUBLICATIONS

Japanese Office Action dated Apr. 5, 2011 (and English translation thereof) in counterpart Japanese Application No. 2007-020816.

* cited by examiner

*Primary Examiner* — Jennifer A Leung
(74) *Attorney, Agent, or Firm* — Holtz, Holtz, Goodman & Chick, PC (57) ABSTRACT

Disclosed is a reactor including: a heater provided on a surface of the reactor; an electrical insulating film which covers the heater and includes a crystalline $RFeO_3$, where R is a rare earth element; and a radiation prevention film provided on the insulating film.

13 Claims, 5 Drawing Sheets

REACTOR WITH ELECTRICAL INSULATING FILM, FUEL CELL APPARATUS, ELECTRONIC DEVICE AND METHOD OF PRODUCING ELECTRICAL INSULATING FILM

BACKGROUND OF THE INVENTION

1. Field of the Invention

The present invention relates to a reactor with an electrical insulating film, fuel cell apparatus, electronic device and method of producing the electrical insulating film.

2. Description of the Related Art

A fuel cell is a reactor for generating electric power by an electrochemical reaction of hydrogen and oxygen. Research and development of fuel cells are being widely done as a main stream power source system of the next generation. Especially, solid oxide fuel cells (hereinafter referred to as SOFC), which have high power generation efficiency due to high temperature operation, are being developed.

The SOFC includes a power generating cell in which a fuel electrode is formed on one face of a solid oxide electrolyte and an oxygen electrode is formed on the other face.

The oxygen supplied to the oxygen electrode is ionized by the electron supplied from the oxygen electrode ($O^{2-}$). The $O^{2-}$ permeates the solid oxide electrolyte from the oxygen electrode side to the fuel electrode side. The $O^{2-}$ oxidizes the fuel gas supplied to the fuel electrode and releases the electron of the fuel electrode. Here, the fuel gas is mainly hydrogen gas, and hydrogen gas and a by-product, carbon monoxide, from reforming fuel such as methanol in which the composition includes hydrogen atoms are used.

The electron from the anode output electrode connected to the fuel electrode passes through an outer circuit and returns to the oxygen electrode by a cathode output electrode connected to the oxygen electrode, and ionizes the oxygen in the oxygen electron. This is how the chemical energy of fuel gas and oxygen is converted to electric energy.

Since the power generating cell of the SOFC operates at a high temperature, a thin film heater including a conductor is provided with an electrical insulating film in between, and the thin film heater performs the heating.

Since the reforming reaction of the fuel gas is also performed at a high temperature, a thin film heater including a conductor is provided in the reformer and the thin film heater heats the reformer (see for example, Japanese Patent Application Laid-Open Publication No. 2004-256837). When the reformer is made from metal and the like, the thin film heater including the conductor is provided with an insulating film in between.

In order to suppress the loss of heat due to radiation from the thin film heater, an electrical insulating film is provided on the surface of the thin film heater and the surface of the thin film heater is covered with a radiation prevention film with an insulating film in between (see for example, Japanese Patent Application Laid-Open Publication No. 8-166269).

The insulating film is formed by, for example, applying $SiO_2$ so as to fill in the unevenness of the thin film heater flatly on the surface of the thin film heater. The radiation prevention film is formed on the surface of the insulating film.

However, the $SiO_2$ film formed with the applying method becomes an amorphous (non-crystalline) structure, and the linear expansion coefficient is 0.5-0.6 ($\times 10^{-6}/°$ C.). The linear expansion coefficient of the metal used in the power generating cell and the thin film heater of the SOFC is 10-14 ($\times 10^{-6}/°$ C.), and there is a big difference between the linear expansion coefficient of the power generating cell and the thin film heater and that of the insulating film. Thus, when the insulating film is provided by the applying method, the insulating film and the thin film heater with a large difference in linear expansion coefficients are in contact with each other, and when the temperature of the reactor becomes high, the insulating film may crack or peel off. This may reduce the reliability of the electrical insulation between the thin film heater and the radiation prevention film (including a conductor such as Au and the like).

SUMMARY OF THE INVENTION

The present invention has been made in consideration of the above situation, and has an advantage of enhancing reliability of electrical insulation of an insulating film which electrically insulates a heater and a radiation preventing film, while maintaining flatness of the film.

According to a first aspect of the present invention, there is provided a reactor comprising:
a heater provided on a surface of the reactor;
an electrical insulating film which covers the heater and includes a crystalline $RFeO_3$, where R is a rare earth element; and
a radiation prevention film provided on the insulating film.

According to a second aspect of the present invention, there is provided a reactor comprising:
a heater provided on a surface of the reactor;
an electrical insulating film which covers the heater and includes a crystalline $RFeO_3$, where R is a rare earth element; and
a metal film provided on the insulating film.

According to a third aspect of the present invention, there is provided a reactor comprising:
a heater provided on a surface of the reactor;
an electrical insulating film which covers the heater and includes a crystalline $RFeO_3$, where R is a rare earth element;
a radiation prevention film provided on the insulating film; and
a second electrical insulating film provided between the reactor and the heater on the surface of the reactor.

According to a fourth aspect of the present invention, there is provided a reactor comprising:
a heater provided on a surface of the reactor;
an electrical insulating film which covers the heater and includes a crystalline $RFeO_3$, where R is a rare earth element;
a radiation prevention film provided on the insulating film; and
a second electrical insulating film which includes a crystalline $RFeO_3$, where R is a rare earth element, the second electrical insulating film being provided between the reactor and the heater on the surface of the reactor.

According to a fifth aspect of the present invention, there is provided a reactor comprising:
a heater provided on a surface of the reactor;
an electrical insulating film which covers the heater and includes a crystalline $RFeO_3$, where R is a rare earth element; and
a radiation prevention film provided on the insulating film, wherein
the reactor includes a fuel cell to generate electric power by an electrochemical reaction.

According to a sixth aspect of the present invention, there is provided a reactor comprising:
a heater provided on a surface of the reactor;
an electrical insulating film which covers the heater and includes a crystalline $RFeO_3$, where R is a rare earth element; and a radiation prevention film provided on the insulating film, wherein the reactor includes a reaction device to generate fuel by a chemical reaction which is sent to a fuel cell to generate electric power by an electrochemical reaction.

According to a seventh aspect of the present invention there is provided a fuel cell apparatus comprising:

the reactor including a fuel cell to generate electric power by an electrochemical reaction including, a heater provided on a surface of the reactor;

an electrical insulating film which covers the heater and includes a crystalline $RFeO_3$, where R is a rare earth element; and a radiation prevention film provided on the insulating film.

According to an eight aspect of the present invention, there is provided a fuel cell apparatus comprising:

the reactor including a reaction device to generate fuel by a chemical reaction which is sent to a fuel cell to generate electric power by an electrochemical reaction including, a heater provided on a surface of the reactor;

an electrical insulating film which covers the heater and includes a crystalline $RFeO_3$, where R is a rare earth element; and a radiation prevention film provided on the insulating film.

According to a ninth aspect of the present invention there is provided an electronic device comprising:

the fuel cell apparatus including the reactor including a fuel cell to generate electric power by an electrochemical reaction including, a heater provided on a surface of the reactor;

an electrical insulating film which covers the heater and includes a crystalline $RFeO_3$, where R is a rare earth element; and a radiation prevention film provided on the insulating film.

According to a tenth aspect of the present invention, there is provided an electronic device comprising:

the fuel cell apparatus including the reactor including a reaction device to generate fuel by a chemical reaction which is sent to a fuel cell to generate electric power by an electrochemical reaction including, a heater provided on a surface of the reactor;

an electrical insulating film which covers the heater and includes a crystalline $RFeO_3$, where R is a rare earth element; and a radiation prevention film provided on the insulating film.

According to an eleventh aspect of the present invention, there is provided a method of producing an insulating film comprising:

applying a mixed solution including $Fe(NO_3)_3$ and $R(NO_3)_3$ so as to cover the heater;

vaporizing a solvent of the mixed solution; and heating and raising a temperature of an applied film of the mixed solution on a reactor including, a heater provided on a surface of the reactor;

an electrical insulating film which covers the heater and includes a crystalline $RFeO_3$, where R is a rare earth element; and a radiation prevention film provided on the insulating film.

According to a twelfth aspect of the present invention, there is provided a reactor comprising:

a heater provided on a surface of the reactor;

an electrical insulating film which covers the heater and includes a crystalline $RAlO_3$, where R is a rare earth element; and a radiation prevention film provided on the insulating film.

According to a thirteenth aspect of the present invention, there is provided a reactor comprising:

a heater provided on a surface of the reactor;

an electrical insulating film which covers the heater and has a linear expansion coefficient within a range from $10.48 \times 10^{-6}/°C.$ to $11.6 \times 10^{-6}/°C.$; and a radiation prevention film provided on the insulating film.

BRIEF DESCRIPTION OF THE DRAWINGS

The present invention will become more fully understood from the following detailed description with the accompanying drawings which are explanatory only, and thus are not intended as a definition of the limits of the present invention, and wherein.

DETAILED DESCRIPTION OF THE PREFERRED EMBODIMENTS

Preferred embodiments for carrying out the present invention will be explained below with reference to the drawings. The embodiments described below include various technically preferable limitations for carrying out the present invention, however, the scope of the invention is not limited to the embodiments and the illustrated embodiments.

First Embodiment

Figure 1:
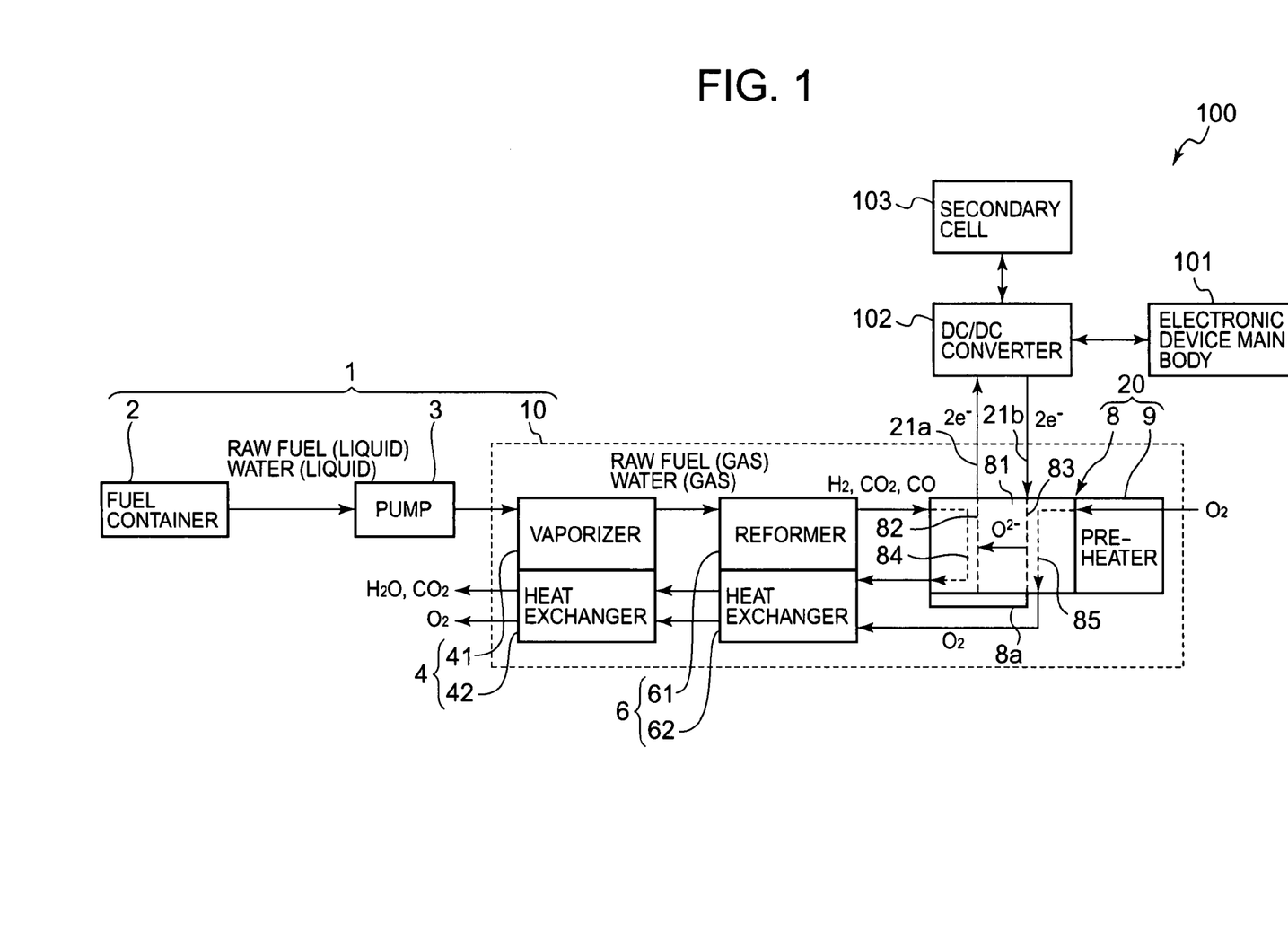
FIG. 1 is a block diagram showing a portable electronic device equipped with a solid oxide fuel cell apparatus.

FIG. 1 is a block diagram showing an electronic device 100 equipped with a fuel cell apparatus 1. This electronic device 100 is a portable electronic device such as a laptop computer, a PDA, an electronic organizer, a digital camera, a cellular phone, a watch, a resister or a projector.

The electronic device 100 includes a fuel cell apparatus 1, a DC/DC converter 102 for converting the electric energy generated by the fuel cell apparatus 1 to a suitable voltage, a secondary cell 103 connected to the DC/DC converter 102, and an electronic device main body 101 to where the electric energy is supplied from the DC/DC converter 102.

The fuel cell apparatus 1 generates electric energy and outputs the energy to the DC/DC converter 102, which will be described later. The DC/DC converter 102 includes a function of converting the electric energy generated in the fuel cell apparatus 1 to a suitable voltage and supplying the energy to the electronic device main body 101, and also carries out a function of charging the secondary cell 103 with the electric energy generated in the fuel cell apparatus 1, and supplying electric energy stored in the secondary cell 103 to the electronic device main body 101 when the fuel cell apparatus 1 is not operating.

Next, the fuel cell apparatus 1 will be described in detail. The fuel cell apparatus 1 comprises a fuel container 2, a pump 3, a heat insulating package 10 and the like. The fuel container 2 of the fuel cell apparatus 1 is removably provided in the electronic device 100 and the pump 3 and the heat insulating package 10 are integrated in the main body of the electronic device 100.

The fuel container 2 stores a liquid mixture of liquid raw fuel (for example methanol, ethanol and dimethyl ether) and water. The liquid raw fuel and water may be stored in separate containers.

The pump 3 draws the liquid mixture into the fuel container 2 and sends the liquid mixture to a vaporizing section 4 in the heat insulating package 10.

The pressure in the box-shaped heat insulating package 10 is maintained in a vacuum pressure (for example, no more than 10 Pa), and the vaporizing section 4, a reforming section 6, and a fuel cell section 20 are accommodated inside the heat insulating package 10. The vaporizing section 4 includes a vaporizer 41 and heat exchanger 42 provided integrally, the reforming section 6 includes a reformer 61 (reactor) and heat exchanger 62 provided integrally, and the fuel cell section 20 includes a power generating cell 8 and air ($O_2$) pre-heater 9 provided integrally.

An electric heater cum temperature sensor 8a is provided in the fuel cell section 20. Since electric resistance value of the electric heater cum temperature sensor 8a depends on the temperature, this electric heater cum temperature sensor 8a functions as a temperature sensor for measuring the temperature of the fuel cell section 20.

The vaporizer 41 heats the liquid mixture sent from the pump 3 to about 110-160° C. with heat from the heat exchanger 42 and heat transfer from the fuel cell section 20 and vaporizes the liquid mixture. The gas mixture vaporized in the vaporizer 41 is sent to the reformer 61.

A catalyst is supported on the wall surface of the flow path inside the reformer 61. The reformer 61 heats the gas mixture sent from the vaporizer 41 to about 300-400° C. with the heat from the heat exchanger 62 and the heat transfer from the fuel cell section 20 and a reforming reaction occurs with the catalyst in the flow path. In other words, the catalytic reaction of the raw fuel and water generates a gas mixture (reformed gas) including hydrogen and carbon dioxide which serve as fuel and a trace amount of carbon monoxide which is a by-product. When the raw fuel is methanol, mainly a steam reforming reaction shown in the following formula (1) occurs in the reformer 61.

$$CH_3OH + H_2O \rightarrow 3H_2 + CO_2 \quad (1)$$

A trace amount of carbon monoxide is generated as a by-product as shown in the following formula (2) which occurs after the chemical reaction formula (1)

$$H_2 + CO_2 \rightarrow H_2O + CO \quad (2)$$

The generated reformed gas is sent to the power generating cell 8.

The power generating cell 8 is a reactor for generating electric power with an electrochemical reaction of reformed gas and oxygen. The power generating cell 8 is a solid oxide fuel cell, comprising an electric cell where a fuel electrode 82 (anode) and an oxygen electrode 83 (cathode) are formed on both sides of a solid oxide electrolyte 81. A fuel supplying flow path 84 for supplying reformed gas to the fuel electrode 82 and an oxygen supplying flow path 85 for supplying oxygen to the oxygen electrode 83 are formed in the power generating cell 8.

As the solid oxide electrolyte 81, zirconia-type $(Zr_{1-x}Y_x)O_{2-x/2}$(YSZ), lanthanum gallate-type $(La_{1-x}Sr_x)(Ga_{1-y-z}Mg_y$-$CO_z)O_3$, etc., as the oxygen electrode 83, $(La_{1-x}Sr_x)MnO_3$, $(La_{1-x}Sr_x)CoO_3$, etc., and as the fuel electrode 82, Ni, Ni+YSZ, etc., may be used, respectively.

The pre-heater 9 pre-heats air supplied to the power generating cell 8 with the heat generated from the power generating cell 8 or the heater cum temperature sensor 8a.

The power generating cell 8 is heated to about 500 to 1000° C. with the heat from the electric heater cum temperature sensor 8a, and a later-described electrochemical reaction occurs.

The air heated with the pre-heater 9 is sent to the oxygen electrode 83 through the oxygen supplying flow path 85. In the oxygen electrode 83, oxygen ion is generated as shown in the following formula (3) with the oxygen in the air and an electron supplied from the cathode output electrode 21b.

$$O_2 + 4e^- \rightarrow 2O^{2-} \quad (3)$$

The solid oxide electrolyte 81 is permeable to oxygen ion, and the oxygen ion generated in the oxygen electrode 83 permeates to the fuel electrode 82.

The reformed gas sent from the reformer 61 is sent to the fuel electrode 82 through the fuel supplying flow path 84. In the oxygen electrode 83, a reaction shown in the following formulas (4) and (5) occur between the oxygen ion permeated through the solid oxide electrolyte 81 and the reformed gas.

$$H_2 + O^{2-} \rightarrow H_2O + 2e^- \quad (4)$$

$$CO + O^{2-} \rightarrow CO_2 + 2e^- \quad (5)$$

The fuel electrode 82 is connected to the anode output electrode 21a and the oxygen electrode 83 is conducted to the cathode output electrode 21b. The anode output electrode 21a and the cathode output electrode 21b is connected to the DC/DC converter 102. Thus, the electron generated in the fuel electrode 82 is passed through the anode output electrode 21a, an outer circuit such as the DC/DC converter 102 and the cathode output electrode 21b and supplied to the oxygen electrode 83.

In the heat exchangers 42 and 62, an exhaust flow path is formed for the reformed gas (exhaust gas A) which passed through the fuel supplying flow path 84 and the air (exhaust gas B) which passed through the oxygen supplying flow path 85. The exhaust gas A and the exhaust gas B is released outside the heat insulating package 10 through the exhaust flow path formed in the heat exchangers 42 and 62. The heat exchangers 42 and 62 raises the temperature of the reformer 61 and the vaporizer 41 with the heat released when the exhaust gas A and the exhaust gas B pass.

Figure 2:
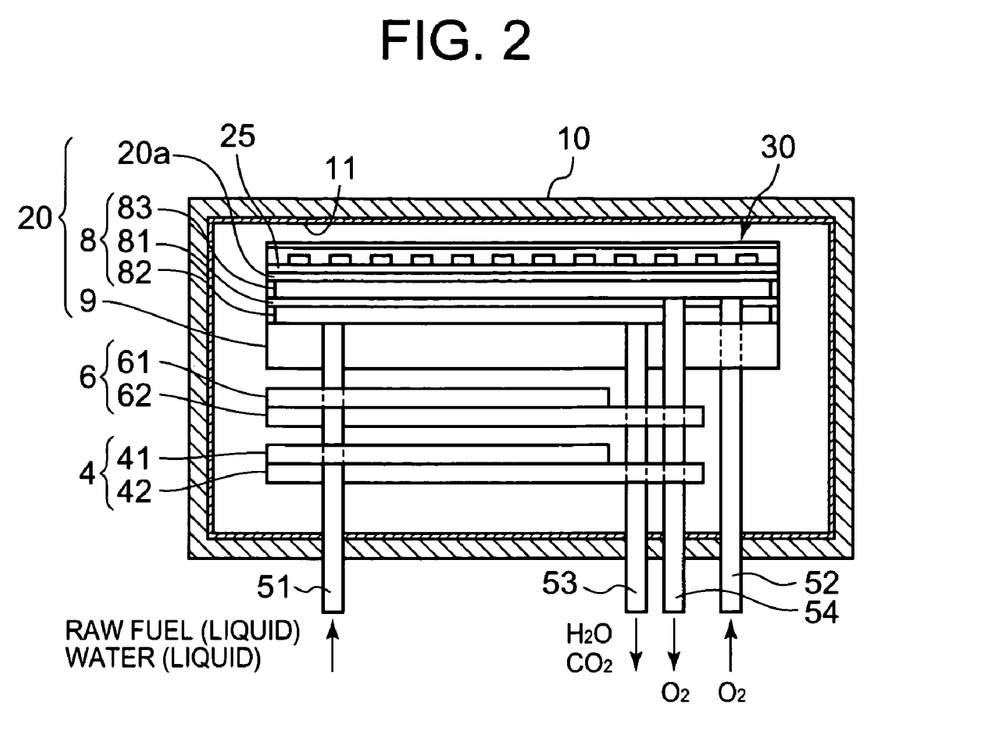
FIG. 2 is a cross-sectional view showing an inner structure of a heat insulating package shown in FIG. 1.

Next, the specific structure of the heat insulating package 10 will be described.

FIG. 2 is a cross-sectional view showing the inner structure of the heat insulating package 10 shown in FIG. 1. As shown in FIG. 2, a fuel supplying flow path 51, an air supplying flow path 52 and an exhaust flow path 53 and 54 penetrate one of the wall surfaces of the heat insulating package 10.

As shown in FIG. 2, in the heat insulating package 10, the vaporizing section 4, the reforming section 6 and the fuel cell section 20 are arranged in this order. The vaporizing section 4, the reforming section 6, the fuel cell section 20 and the heat insulating package 10 can be formed using a metal with high temperature durability and a moderate thermal conductivity, and it is preferable that they are formed using especially metal with heat resistance, for example Ni based inconel alloy such as inconel 783.

A radiation preventing film 11 is formed on the inner wall surface of the heat insulating package 10 for preventing heat transmission due to radiation. The radiation preventing film 11 can be formed by, for example, Au, Ag and the like. The radiation preventing film may be formed on the outer wall surface of the vaporizing section 4, the reforming section 6 and the fuel cell section 20. Of course, the radiation preventing film can be formed on both the inner wall surface of the heat insulating package 10 and the outer wall surface of the vaporizing section 4, the reforming section 6 and the fuel cell section 20.

Figure 3:
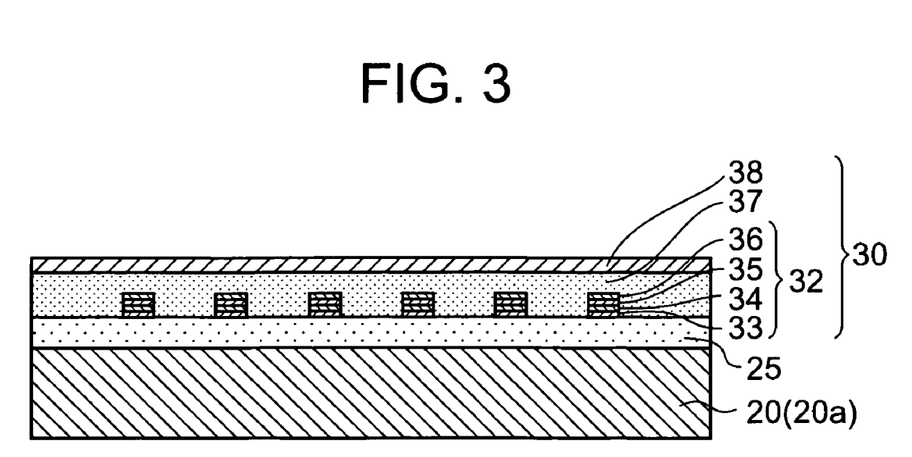
FIG. 3 is a cross-sectional view of a heating section.

The fuel cell section 20 includes a metal substrate 20a, the pre-heater 9 and the power generating cell 8. On the surface of the metal substrate 20a, an electrical insulating film 25 is formed, and a heating section 30 is provided above it. FIG. 3 is a cross-sectional view of a portion of the heating section 30 including the metal substrate 20a and the insulating film 25.

Here, a power generating cell section 20 including the metal substrate 20a and the insulating film 25 is referred to as the fuel cell section (reactor).

The heating section 30 includes a thin film heater 32 which is formed on the surface of the insulating film 25 and functions as the electric heater cum temperature sensor 8a, an electrical insulating film 37 which covers the thin film heater 32, and a radiation preventing film 38 formed on the surface of the insulating film 37.

The radiation preventing film 38 prevents heat transmission due to radiation and the same material as the radiation preventing film 11 can be used.

The insulating film 25 is an $R_2O_3$ film with a crystal structure. Here, R is a rare earth element (Sc, Y, La, Ce, Pr, Nd, Pm, Sm, Eu, Gd, Tb, Dy, Ho, Er, Tm, Yb, Lu) and for example, $Y_2O_3$ with a bixbite crystal structure may be used as $R_2O_3$. In the $R_2O_3$ film with a crystal structure, the atoms are more densely packed compared to an amorphous state, therefore the expansion due to heat becomes larger. The result is preferable in that, since a linear expansion coefficient becomes higher, the linear expansion coefficient becomes close to the linear expansion coefficient of the metal substrate 20a which is to be the fuel cell section 20.

The $R_2O_3$ film with the crystal structure can be formed with a sputter method using the $R_2O_3$ as a target material. In order to enhance the crystallization, it is preferable that annealing is performed in the air or in inert gas after the film is formed. The film forming method is not limited to the sputter method, and may be vapor deposition method, CVD method, ion plating method, coating method, etc.

It is preferable that the purity of the insulating film 25 is no less than 90 mol %, and in the present embodiment, the purity is no less than 99 mol %.

It is preferable that the thickness of the insulating film 25 is about 200 nm to 600 nm.

A thin film heater 32 is patterned in a serpentine state on the surface of the insulating film 25 with a photolithographic technique. The thin film heater 32 is stacked layers of a metal adhesion layer 33, a diffusion prevention layer 34, a heat generation resistance layer 35, a diffusion prevention layer 36, stacked in this order from the insulating film 25 side.

The heat generation resistance layer 35 is a conductor with the lowest resistivity among the three layers (for example, Au) and when a voltage is applied to the thin layer heater 32, a current flows intensively and heat is generated.

It is preferable that the diffusion prevention layers 34 and 36 are formed with material where even when the thin film heater 32 generates heat, the material of the heat generation resistance layer 35 resists heat diffusion to the diffusion prevention layers 34 and 36 and the material of the heat diffusion prevention layers 34 and 36 resist heat diffusion to the heat generation resistance layer 35. It is also preferable that the material used is a material with a relatively high melting point and low reactivity (for example, W).

Since the adhesion of the diffusion prevention layer 34 to insulating film 25 is low, a metal adhesion layer 33 is provided to prevent the diffusion prevention layer 34 from peeling off. The metal adhesion layer 33 is made from a material (for example, Ta, Mo, Ti, Cr) with good adhesion to both diffusion prevention layer 34 and insulating film 25. It is preferable that the film thickness of the metal adhesion layer 33 is 100-200 nm, the film thickness of the diffusion prevention layer 34 and 36 is 50-100 nm and the film thickness of the heat generation resistance layer 35 is 200-400 nm.

The insulating film 37 is an $RFeO_3$ film or $RAlO_3$ film (R is a rare earth element) with a perovskite-type crystal structure. Here, R is a rare earth element (Sc, Y, La, Ce, Pr, Nd, Pm, Sm, Eu, Gd, Tb, Dy, Ho, Er, Tm, Yb, Lu) and for example, $LaFeO_3$, $SmFeO_3$, $GdFeO_3$, etc. may be used as $RFeO_3$. In the $RFeO_3$ film or the $RAlO_3$ film with a perovskite-type crystal structure, the atoms are more densely packed compared to an amorphous state, therefore the expansion due to heat becomes larger. The result is preferable in that, since a linear expansion coefficient becomes higher, the linear expansion coefficient becomes close to the linear expansion coefficient of the metal which is to be the radiation preventing film 38.

Table 1 is a table showing the linear expansion coefficient of the insulating material used in the insulating film 25 and 37, the metal used in the fuel cell section 20, etc., and the material used in the solid oxide electrolyte 81 and fuel electrode 82.

TABLE 1

| Material | Linear Expansion Coefficient ($\times 10^{-6}$/° C.) | Structure |
|---|---|---|
| Mn | 21 | Crystal |
| Co | 12.4 | Crystal |
| Ni | 12.7 | Crystal |
| Stainless Steel SUS410 | 14.7 | Crystal |
| Inconel 600 (Ni alloy) | 13.8 | Crystal |
| Inconel 783 (Ni alloy) | 10.2 | Crystal |
| Inconel 800 (Ni alloy) | 15.9 | Crystal |
| Inconel 925 (Ni alloy) | 14.2 | Crystal |
| YSZ $((ZrO_2)_{0.9} \cdot (Y_2O_3)_{0.1})$ | 10.3 | Crystal: Fluorite-type |
| $La_{0.9}Sr_{0.1}MnO_3$ | 10.5 | Crystal: Perovskite-type |
| $La_{0.8}Sr_{0.2}MnO_3$ | 10.6 | Crystal: Perovskite-type |
| $La_{0.7}Sr_{0.3}MnO_3$ | 10.7 | Crystal: Perovskite-type |
| Quartz Glass | 0.5-0.6 | Amorphous |
| Quartz | a axis: 6.8-9.0 c axis: 12.0-14.0 | Crystal |
| $Y_2O_3$ | 7.2 | Crystal |
| $LaFeO_3$ | 11.6 | Crystal: Perovskite-type |
| $GdAlO_3$ | a axis: 10.48 | Crystal: Perovskite-type |
| $YAlO_3$ | a axis: 11.22 | Crystal: Perovskite-type |

As for the material used as the metal substrate, the linear expansion coefficient of Mn was 21 ($\times 10^{-6}$/° C.), the linear expansion coefficient of Co was 12.4 ($\times 10^{-6}$/° C.), the linear expansion coefficient of Ni was 12.7 ($\times 10^{-6}$/° C.) and the linear expansion coefficient of stainless steel (SUS 410) was 14.7 ($\times 10^{-6}$/° C.).

As for the linear expansion coefficient of the heat resistance metal Ni alloy, inconel 600 was 13.8 ($\times 10^{-6}$/° C.), inconel 783 was 10.2 (×10⁻⁶/° C.), inconel 800 was 15.9 (×10⁻⁶/° C.), and inconel 925 was 14.2 (×10⁻⁶/° C.).

The linear expansion coefficient of YSZ ($(ZrO_2)_{0.9}$·$(Y_2O_3)_{0.1}$) (fluorite-type crystal structure) used in the solid oxide electrolyte of the SOFC was 10.3 (×10⁻⁶/° C.). As for the linear expansion coefficient of the material used as the fuel electrode in the SOFC, $La_{0.9}Sr_{0.1}MnO_3$ was 10.5 (×10⁻⁶/° C.), $La_{0.8}Sr_{0.2}MnO_3$ was 10.6 (×10⁻⁶/° C.), and $La_{0.7}Sr_{0.3}MnO_3$ was 10.7 (×10⁻⁶/° C.) (all elements have a perovskite-type crystal structure).

As for the linear expansion coefficient of the insulating material used as an insulating film, the amorphous $SiO_2$ (quartz glass) was 0.5-0.6 (×10⁻⁶/° C.), the $SiO_2$ with a crystal structure (quartz) was 6.8-9.0 (×10⁻⁶/° C.) (a axis) and 12.0-14.0 (×10⁻⁶/° C.) (c axis), the $Y_2O_3$ with a crystal structure was 7.2 (×10⁻⁶/° C.) and the $LaFeO_3$ with a perovskite-type crystal structure was 11.6 (×10⁻⁶/° C.).

Therefore, the linear expansion coefficient of the crystalline $LaFeO_3$ is closer to the linear expansion coefficient of the material used for the solid oxide electrolyte and oxygen electrode of the SOFC or the metal compared to the amorphous $SiO_2$, and is suitable to be used in the insulating film 25 and the insulating film 37.

Similarly, the linear expansion coefficients of $SmFeO_3$ and $GdFeO_3$ are close to the linear coefficient of the material used for the solid oxide electrolyte, oxygen electrode, etc. of the SOFC or the metal, and it is considered that these are suitable to be used in the insulating film 25 and the insulating film 37.

Further, the linear expansion coefficients of $GdAlO_3$ and $YAlO_3$ are close to the linear coefficient of the material used for the solid oxide electrolyte and oxygen electrode of the SOFC or the metal, and it is considered that these are suitable to be used in the insulating film 25 and the insulating film 37.

Next, the process of forming an insulating film 37 covering the thin film heater 32 will be described.

The insulating film 37 can be formed by the nitrate thermal decomposition method shown below. The process of forming an insulating film 37 made from $SmFeO_3$ will be described below.

(1). Dissolve $Sm(NO_3)_3 \cdot 9H_2O$ and $Fe(NO_3)_3 \cdot 6H_2O$ with a mole ratio 1:1 in pure water or 1 methyl-2 pyrrolidone so as to be about 1.0 mol/L, and make a mixed solution of $Sm(NO_3)_3$ and $Fe(NO_3)_3$.

(2). Apply evenly the solution of (1) with a spinner on the metal substrate on which the insulating film 25 and the thin film heater 32 is formed.

(3). Vacuum the substrate of (2) with a rotary pump and vaporize the solvent.

(4). Place the substrate of (3) in an electric furnace to raise the temperature to 750° C. and form a crystalline $SmFeO_3$.

Figure 4:
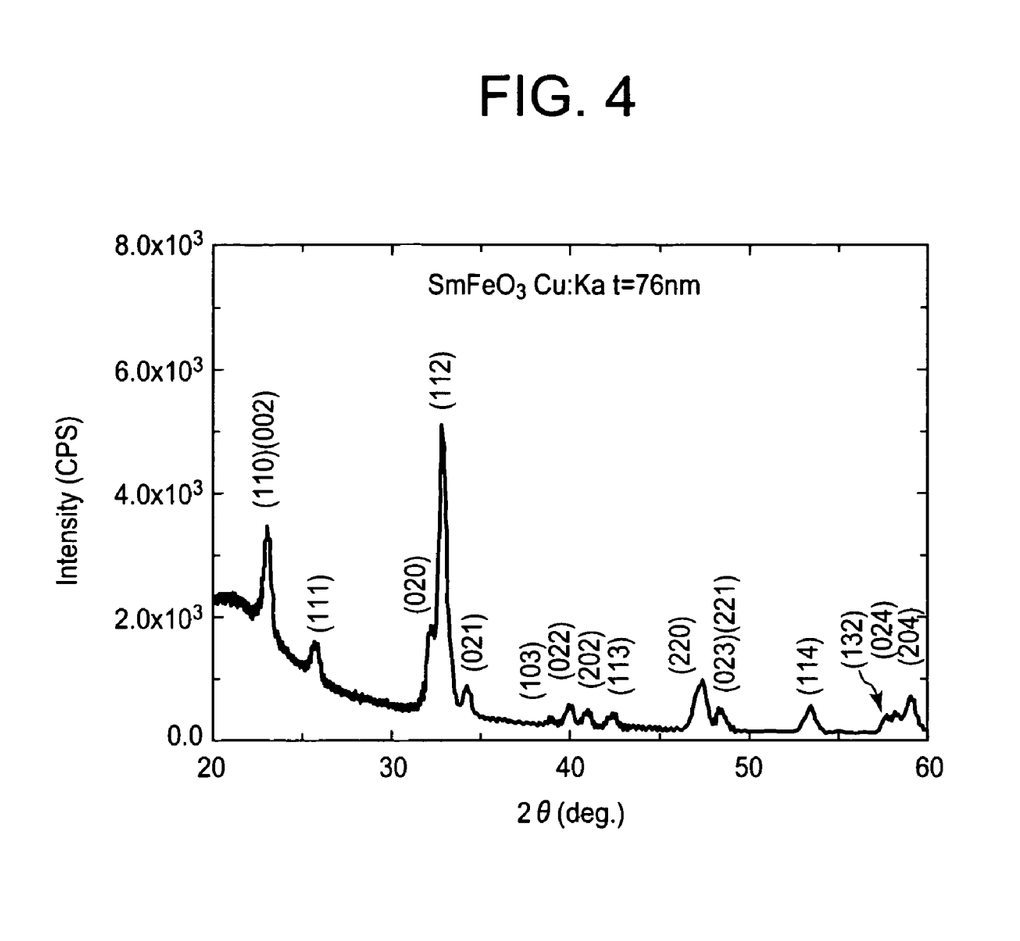
FIG. 4 is a result of an X-ray diffraction of a $SmFeO_3$ thin film formed on a quartz glass substrate.

FIG. 4 is a result of an X-ray diffraction of a thin film of $SmFeO_3$ formed on a quartz glass substrate using the above-described process. The crystal does not have an extreme orientation, however compared to when the crystal is oriented randomly, the relative intensity of the diffraction peak from a (112)(002) face is large and a (020) face seems as if it overlaps a (112) face. The uniformity of this sample was favorable even with an observation by a reflecting microscope.

A thin film of $SmFeO_3$ has been described above, and similarly, a crystalline thin film may be formed with the nitrate thermal decomposition method as for $LaFeO_3$, $GdFeO_3$ and other $RFeO_3$ and $RAlO_3$.

For example, in step (1), by dissolving $R(NO_3)_3 \cdot 9H_2O$ and $Fe(NO_3)_3 \cdot 6H_2O$ with a mole ratio 1:1 in pure water or 1 methyl-2 pyrrolidone so as to be about 1.0 mol/L, and making a mixed solution of $Sm(NO_3)_3$ and $Fe(NO_3)_3$, similarly, a crystalline $RFeO_3$ can be formed.

Alternatively, in step (1) by dissolving $R(NO_3)_3 \cdot 9H_2O$ and $Al(NO_3)_3 \cdot 9H_2O$ with a mole ratio 1:1 in pure water or 1 methyl-2 pyrrolidone so as to be about 1.0 mol/L, and making a mixed solution of $Sm(NO_3)_3$ and $Al(NO_3)_3$, similarly, a crystalline $RAlO_3$ can be formed.

Second Embodiment

Next, the second embodiment of the present invention will be described.

Figure 5:
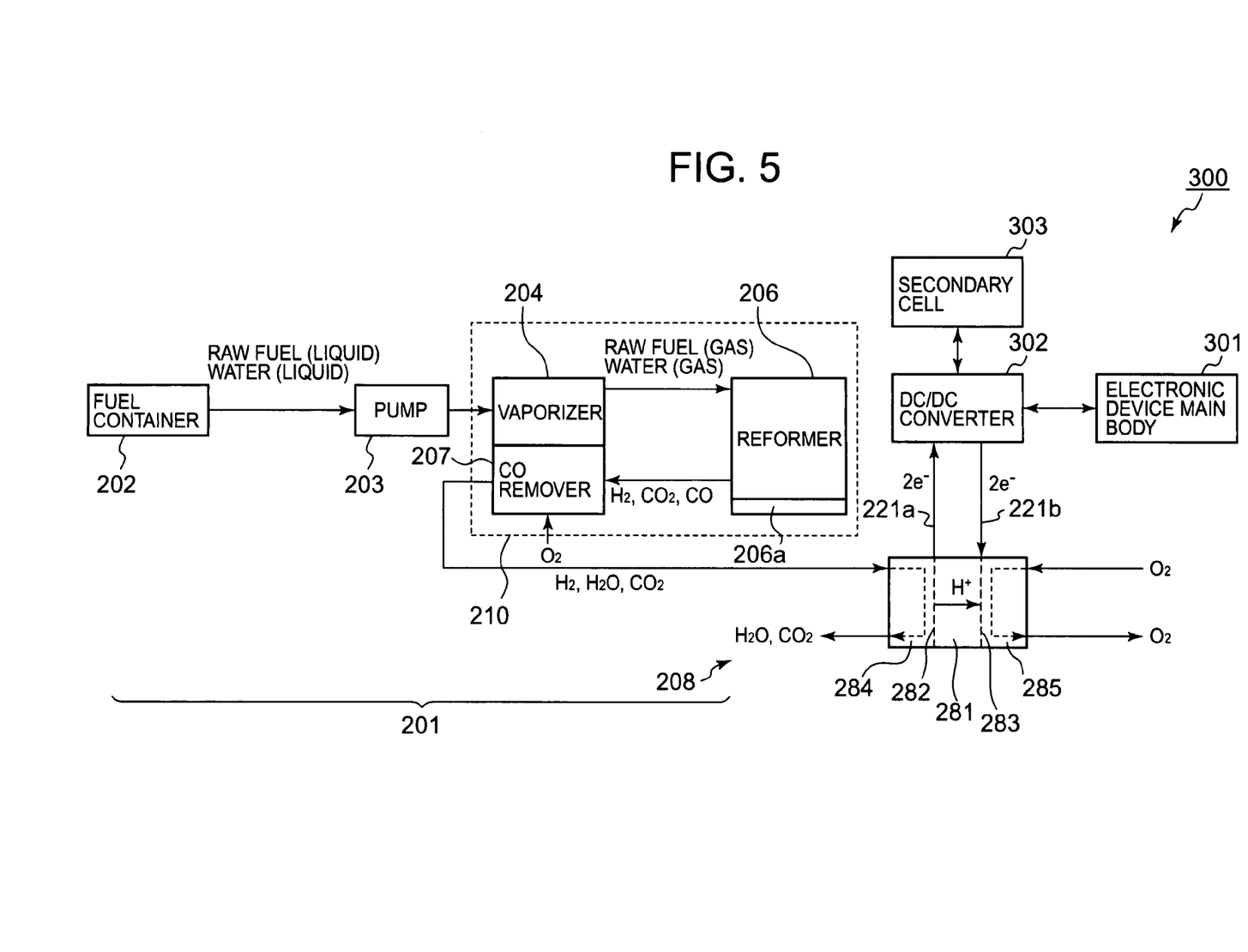
FIG. 5 is a block diagram showing an electronic device equipped with a polymer electrolyte fuel cell apparatus.

FIG. 5 is a block diagram showing an electronic device 300 equipped with a fuel cell apparatus 201 using a polymer electrolyte fuel cell (PEFC). A fuel container 202, a pump 203, a vaporizer 204, a reformer 206, an electronic device main body 301, a DC/DC converter 302 and a secondary cell 303 are similar to the first embodiment, thus the description is omitted.

In this embodiment, the vaporizer 204, the reformer (reactor) 206 and a CO remover 207 are accommodated in a heat insulating package 210.

An electric heater cum temperature sensor 206a is provided in the reformer 206. The electric heater cum temperature sensor 206a heats the reformer 206 to perform the reforming reaction in the reformer 206. Since electric resistance value of the electric heater cum temperature sensor 206a depends on the temperature, this electric heater cum temperature sensor 206a functions as a temperature sensor for measuring the temperature of the reformer 206a.

The CO remover 207 removes the CO, which is generated by a reaction in the reformer 206 as shown in the formula (2), by a reaction shown in a formula (6).

$$CO + 1/2 O_2 \rightarrow CO_2 \quad (6)$$

The reaction in the CO remover 207 is performed at about 110-160° C.

The reformed gas from which the CO has been removed is supplied to the power generating cell 208.

The power generating cell 208 is a polymer electrolyte fuel cell, comprising a film electrode joint formed with a fuel electrode 282 (anode) and an oxygen electrode 283 (cathode) on both sides of an electrolyte film 281 which is permeable to hydrogen ion. A fuel supplying flow path 284 which supplies reformed gas to the fuel electrode 282 and an oxygen supplying flow path 285 which supplies oxygen to the oxygen electrode 283 are formed in the power generating cell 208.

The reaction shown in formula (7) occurs in the fuel electrode 282 and the reaction shown in formula (8) occurs in the oxygen electrode 283 and an electron generated in the fuel electrode 282 passes through the anode electrode 221a, the DC/DC converter 302 and the cathode electrode 221b to the oxygen electrode 283.

$$H_2 \rightarrow 2H^+ + 2e^- \quad (7)$$

$$2H^+ + 2e^- + 1/2 O_2 \rightarrow H_2O \quad (8)$$

Figure 6:
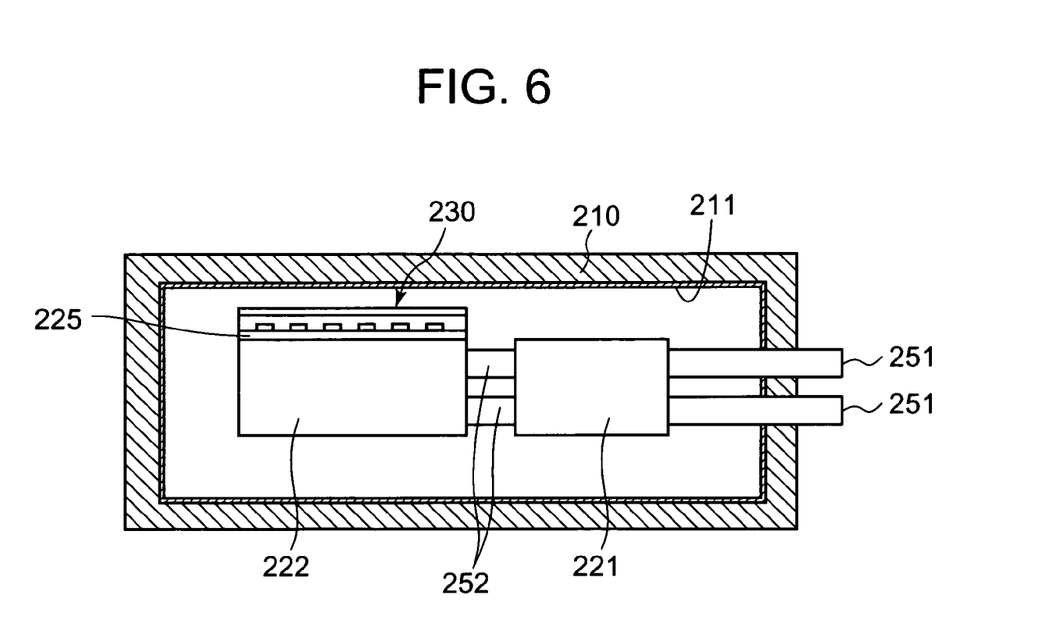
FIG. 6 is a cross-sectional view showing an inner structure of a heat insulating package shown in FIG. 5.

Next, the specific structure of the heat insulating package 210 will be explained.

FIG. 6 is a cross-sectional view showing the inner structure of the heat insulating package 210 shown in FIG. 5. As shown in FIG. 6, inside the heat insulating package 210, a low temperature reacting section 221 including the vaporizer 204 and the CO remover 207 formed integrally, and a high temperature reacting section 222 including a reformer 206 are arranged in this order.

On the inner wall surface of the heat insulating package 210, a radiation preventing film 211 similar to that of the first embodiment is formed. A similar radiation preventing film may be formed on the outer wall surface of the low temperature reacting section 221 and the high temperature reacting section 222. Of course, the radiation preventing film may be formed on both the inner wall of the heat insulating package 10 and the outer wall of the low temperature reacting section 221 and the high temperature reacting section 222.

A tube material 251 which is a flow path for supplying fuel to the vaporizing section 204, supplying air to the CO remover 207, and sending reformed gas to the power generating cell 208 penetrates one of the wall surfaces of the heat insulating package 10. This flow path is connected to the low temperature reacting section 221. The low temperature reacting section 221 and the high temperature reacting section 222 are connected by a connecting tube 252 which is a flow path for sending vaporized fuel gas to the reformer 206 and sending reformed gas to the CO remover 207.

A heating section 230 is provided on the surface of the high temperature reacting section 222 with an insulating film 225 in between. This heating section 230 has a similar structure as the heating section 30 of the first embodiment, and can be similarly formed to the heating section 30.

When the reformer is made from glass and the like, the insulating film 225 is not necessary. Here, the reformer includes the insulating film 225.

As shown above, the present invention may be used in a fuel cell apparatus using a polymer electrolyte fuel cell and an electronic device equipped with the apparatus.

The entire disclosure of Japanese Patent Application No. 2007-020816 on Jan. 31, 2007 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A reactor comprising:
a metal substrate;
a first electrical insulating film having electrical insulation, and provided on a surface of the metal substrate;
a thin-film heater provided on the first electrical insulating film;
a second electrical insulating film having electrical insulation, and provided above the first electrical insulating film so as to cover the thin-film heater; and
a radiation prevention film provided on the second electrical insulating film,
wherein the first electrical insulating film includes a crystalline $R_2O_3$ having a bixbite structure or a crystalline $RFeO_3$ having a perovskite structure, where R is a rare earth element, and
wherein the second electrical insulating film includes a crystalline $RFeO_3$ having a perovskite structure, where R is a rare earth element.

2. A reactor comprising:
a metal substrate;
a first electrical insulating film having electrical insulation, and provided on a surface of the metal substrate;
a thin-film heater provided on the first electrical insulating film;
a second electrical insulating film having electrical insulation, and provided above the first electrical insulating film so as to cover the thin-film heater; and
a metal film provided on the second electrical insulating film,
wherein the first electrical insulating film includes a crystalline $R_2O_3$ having a bixbite structure or a crystalline $RFeO_3$ having a perovskite structure, where R is a rare earth element, and
wherein the second electrical insulating film includes a crystalline $RFeO_3$ having a perovskite structure, where R is a rare earth element.

3. The reactor according to claim 1, wherein the metal substrate includes Mn, Co, Ni, or an Ni alloy.

4. The reactor according to claim 1, wherein the reactor includes a fuel cell to generate electric power by an electrochemical reaction.

5. The reactor according to claim 1, wherein the reactor includes a reaction device to generate fuel by a chemical reaction which is sent to a fuel cell to generate electric power by an electrochemical reaction.

6. A fuel cell apparatus comprising the reactor according to claim 4.

7. A fuel cell apparatus comprising the reactor according to claim 5.

8. An electronic device comprising the fuel cell apparatus according to claim 6.

9. An electronic device comprising the fuel cell apparatus according to claim 7.

10. A method of producing the reactor according to claim 1, the method comprising:
forming the second insulating film by applying a mixed solution including $Fe(NO_3)_3$ and $R(NO_3)_3$ so as to cover the heater;
vaporizing a solvent of the mixed solution; and
heating and raising a temperature of an applied film of the mixed solution.

11. A reactor comprising:
a metal substrate;
a first electrical insulating film having electrical insulation, and provided on a surface of the metal substrate;
a thin-film heater provided on the first electrical insulating film;
a second electrical insulating film having electrical insulation and a linear expansion coefficient within a range from $10.48 \times 10^{-6}/°$ C. to $11.6 \times 10^{-6}/°$ C., and provided above the first electrical insulating film so as to cover the thin film heater; and
a radiation prevention film provided on the second electrical insulating film,
wherein the first electrical insulating film includes a crystalline $R_2O_3$ having a bixbite structure or a $RFeO_3$ having a perovskite structure, where R is a rare earth element, and
wherein the second electrical insulating film includes a crystalline $RFeO_3$ having a perovskite structure, where R is a rare earth element.

12. The reactor according to claim 1, wherein:
the thin-film heater includes an adhesion layer, a first diffusion prevention layer, a heat generation resistance layer, and a second diffusion prevention layer which adhere to each other and which are stacked in the order named from a first electrical insulating film side;
the adhesion layer comprises Ta, Mo, Ti, or Cr;
the first diffusion prevention layer and the second diffusion prevention layer include W; and
the heat generation resistance layer includes Au.

13. The reactor according to claim 1, wherein the radiation prevention film includes Au or Ag.

* * * * *

UNITED STATES PATENT AND TRADEMARK OFFICE
CERTIFICATE OF CORRECTION

PATENT NO. : 8,241,582 B2
APPLICATION NO. : 12/011742
DATED : August 14, 2012
INVENTOR(S) : Osamu Nakamura It is certified that error appears in the above-identified patent and that said Letters Patent is hereby corrected as shown below:

In the Claims:

Column 12, Line 47 (Claim 11, Line 15);

change "a" (second occurrence) to --a crystalline--.

Signed and Sealed this
Nineteenth Day of February, 2013

Teresa Stanek Rea
*Acting Director of the United States Patent and Trademark Office*